(12) United States Patent
Pogorelik

(10) Patent No.: US 10,937,411 B2
(45) Date of Patent: *Mar. 2, 2021

(54) METHODS, APPARATUS, AND ARTICLES OF MANUFACTURE TO GENERATE VOICES FOR ARTIFICIAL SPEECH BASED ON AN IDENTIFIER REPRESENTED BY FREQUENCY DEPENDENT BITS

(71) Applicant: Intel Corporation, Santa Clara, CA (US)

(72) Inventor: Oleg Pogorelik, Lapid (IL)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/590,850

(22) Filed: Oct. 2, 2019

(65) Prior Publication Data

US 2020/0043463 A1 Feb. 6, 2020

Related U.S. Application Data

(63) Continuation of application No. 15/476,421, filed on Mar. 31, 2017, now Pat. No. 10,468,013.

(51) Int. Cl.
*G10L 13/033* (2013.01)
*A47L 5/30* (2006.01)
*G06N 3/00* (2006.01)
*G06F 21/10* (2013.01)

(52) U.S. Cl.
CPC .............. *G10L 13/033* (2013.01); *A47L 5/30* (2013.01); *G06F 21/10* (2013.01)

(58) Field of Classification Search
CPC ......... A47L 5/30; G10L 13/033; G06N 3/008; G06F 21/10
USPC .................................. 700/245, 246; 726/26
See application file for complete search history.

(56) References Cited

U.S. PATENT DOCUMENTS

| 10,468,013 B2 * | 11/2019 | Pogorelik ................. A47L 5/30 |
| 2003/0074107 A1 | 4/2003 | Noma et al. |
| 2004/0081110 A1 | 4/2004 | Koskimies |
| 2007/0250212 A1 | 10/2007 | Halloran et al. |
| 2008/0114739 A1 | 5/2008 | Hayes |
| 2009/0157223 A1 | 6/2009 | Park et al. |

(Continued)

OTHER PUBLICATIONS

United States Patent and Trademark Office, "Advisory Action Before the Filing of an Appeal Brief", issued in connection with U.S. Appl. No. 15/476,421, dated Apr. 25, 2019, (6 pages).

(Continued)

*Primary Examiner* — Farzad Kazeminezhad
(74) *Attorney, Agent, or Firm* — Hanley, Flight & Zimmerman, LLC

(57) ABSTRACT

Methods, apparatus, and articles of manufacture to generate voices for artificial speech are disclosed. An example apparatus includes a component storing an identifier, the identifier uniquely identifying the apparatus from a plurality of apparatus, an artificial speech generator to generate a first artificial speech signal representing text, the first artificial speech signal generated based on the identifier, the first artificial speech signal audibly different from artificial speech signals generated by respective ones of the plurality of apparatus for the text, an output device to output an audible signal representing the first artificial speech signal.

21 Claims, 6 Drawing Sheets

(56) References Cited

U.S. PATENT DOCUMENTS

| | | | |
|---|---|---|---|
| 2012/0011592 | A1 | 1/2012 | Loytynoja et al. |
| 2016/0142157 | A1 | 5/2016 | Jeong et al. |
| 2016/0155094 | A1 | 6/2016 | Rentsch |
| 2018/0203442 | A1 | 7/2018 | Kotlyarov |
| 2018/0286384 | A1 | 10/2018 | Pogorelik |

OTHER PUBLICATIONS

United States Patent and Trademark Office, "Non-Final Office Action", issued in connection with U.S. Appl. No. 15/476,421, dated Aug. 29, 2018, (27 pages).

United States Patent and Trademark Office, "Final Office Action", issued in connection with U.S. Appl. No. 15/476,421, dated Feb. 14, 2019, (45 pages).

United States Patent and Trademark Office, "Notice of Allowance", issued in connection with U.S. Appl. No. 15/476,421, dated Jul. 5, 2019, (21 pages).

\* cited by examiner

METHODS, APPARATUS, AND ARTICLES OF MANUFACTURE TO GENERATE VOICES FOR ARTIFICIAL SPEECH BASED ON AN IDENTIFIER REPRESENTED BY FREQUENCY DEPENDENT BITS

RELATED APPLICATIONS

This patent arises from a continuation of U.S. patent application Ser. No. 15/476,421, filed on Mar. 31, 2017, and which is incorporated herein by reference in its entirety.

FIELD OF THE DISCLOSURE

The present disclosure relates generally to artificial speech and, more particularly, to methods, apparatus, and articles of manufacture to generate voices for artificial speech.

BACKGROUND

The marketplace is increasingly being flooded with smart and highly interactive devices. Many of these systems are voice-based interactive devices that communicate with end users using artificial speech. Example voice-based interactive devices include, but are not limited to, robots, toys, computers, smartphones, tablets, intelligent personal assistants, appliances, televisions, Internet of Things (IoT) devices, etc.

DETAILED DESCRIPTION

Figure 1:
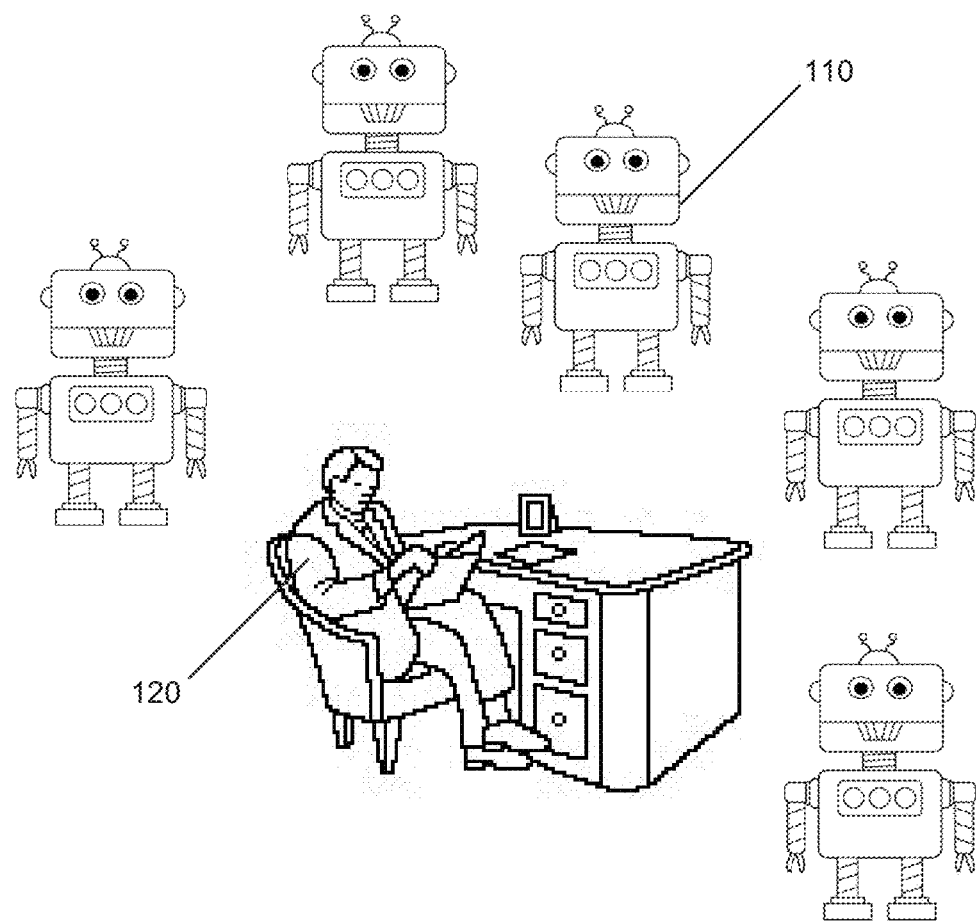
FIG. 1 illustrates an example system having multiple voice-based interactive devices.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Many prior voice-based interactive devices implement a limited number (e.g., one, six, ten, etc.) of voices (e.g., Siri®, Cortana®, female, male, machine, etc.) from which a user can select. Because of the limited number of voices, when users have many prior voice-based interactive devices, it can be difficult or impossible to audibly discern with which voice-based interactive device they are interacting. Moreover, while prior voice-based interactive devices from a limited set of voices can help audibly distinguish the devices, the configuration of voices can be too complicated for some end users. Furthermore, prior voice-based interactive device customization can be expensive to have performed, and may require ongoing maintenance (e.g., reset to factory defaults will mandate following restore, etc.). Further still, while prior systems exist to dynamically add and configure voice-based interactive devices to a group, such systems do not configure them with different voices.

Example methods, apparatus, and articles of manufacture to generate voices for artificial speech are disclosed herein that overcome at least these deficiencies of prior voice-based interactive devices. Disclosed examples generate voices that are unique to each voice-based interactive device, without having to rely on configuration or customization. For example, two of the same voice-based interactive device set to use the same voice (e.g., Siri) will output audibly different (e.g., discernable, distinct, unique, different, etc.), by employing the teachings of this disclosure. According to aspects of this disclosure, voice-based interactive devices use a unique device-specific identifier associated with the voice-based interactive device to personalize (e.g., distinguish, personify, individualize, render unique, etc.) the artificial speech output of the voice-based interactive device. Unique device-specific identifiers are included in most voice-based interactive devices.

Unique device-specific identifiers are unique in that two voice-based interactive devices will not have the same unique device-specific identifier. Example unique device-specific identifiers include, but are not limited to, a serial number, an international mobile equipment identity (IMEI) number, a media access control (MAC) address, a device unique identifier (DUID), a management information base (MIB) identifier, a processor serial number, a central processing unit (CPU) serial number, and a Bluetooth® address. In some examples, a device-specific unique identifier is used as input(s) to an audio synthesizer to generate voice personalization sounds such as harmonics, disharmonious overtones, etc. that complement the tonality, gender overtones, dominating harmonics of original artificial speech. After being adapted to blend with the amplitude of the original artificial speech, the voice personalization sounds are mixed with the original artificial speech to form personalized artificial speech that is unique and distinguishable from that generate by any other voice-based interactive device. The examples disclosed herein can be used to generate voices for artificial speech for voice-based interactive devices having a unique identifier, even if those voice-based interactive devices did not originally implement the example methods, apparatus and articles of manufacture to generate voices for artificial speech disclosed herein. The teachings of this disclosure can also be used to render the outputs of any other type(s) of devices unique using unique device-specific identifiers. For example, unique device-specific identifiers may be used to render the same ringtone, notification sound, etc. audibly different when output by different devices.

References made herein to speaking, artificial speech, etc. in regards to a voice-based interactive device are in the anthropomorphic sense, in that a machine, for example, converts text into artificial speech signals that mimic the human generation of audible speech. References to voices herein refer to audible differences in how the same text is converted to artificial speech signals by different voice-based interactive devices that have different unique device-specific identifiers. In some examples, text refers to an electronic representation of printed text or characters in the form of bits (e.g., ones and zeros). For example, bytes (e.g., eight bits) may be used to represent text in the form of ASCII characters. As used herein, signal refers to analog and digital signals of any type. An example analog signal is an analog voltage waveform that can be used to cause an output device (e.g., a speaker) to render a speech-like audible signal. A digital signal can include one or more digital values (e.g., each represented by one or more bits) alone and/or in sequence that represent a variable, a parameter, a coefficient, variables, parameters, coefficients, etc., or any combinations thereof. In some examples, a digital signal is converted to form an analog signal. In some example, an analog signal is converted to a digital signal. Signals can be internal and/or external.

FIG. 1 illustrates an example system 100 having a plurality of voice-based interactive devices (one of which is designated at reference numeral 110) in the form of robots that produce artificial speech using unique respective voices in accordance with the teachings of this disclosure. In the example system 100 of FIG. 1, the example robots 110 speak with audibly different (e.g., discernable, distinct, unique, different, etc.) respective voices that allow a person 120 to readily discern which of the robots 110 is speaking. The robots 110 generate artificial speech that is audibly different based on the unique device-specific identifiers that uniquely identify each robot 110, possibly even while they are speaking at the same time. Because the robots 110 sound different to the person 120, the person 120 can more easily identify which robot 110 is speaking and, thus, more easily determine how to command and/or respond to the robot 110.

Figure 2:
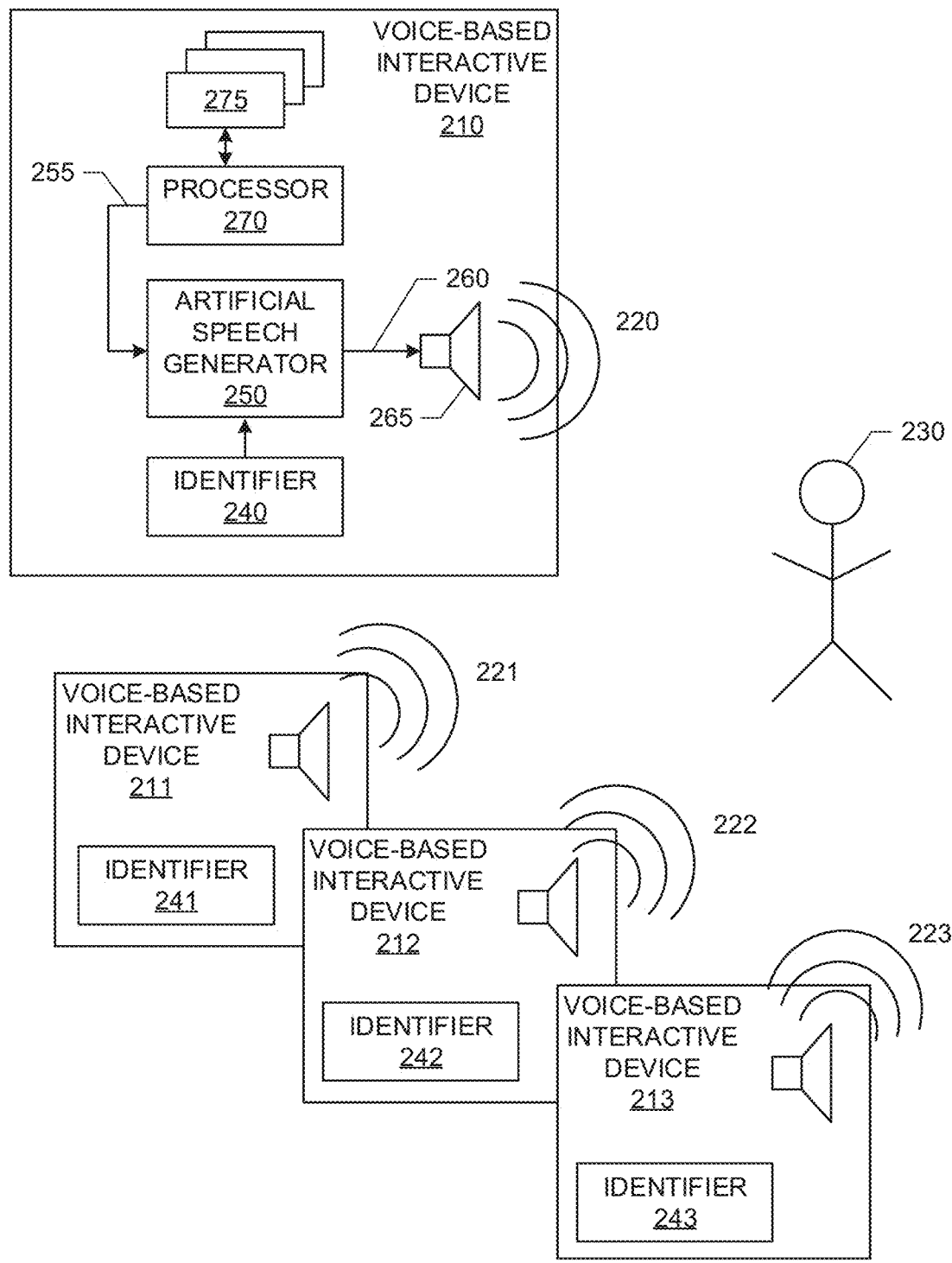
FIG. 2 is a block diagram of an example system having multiple voice-based interactive devices that generate artificial speech using unique different voices according to the teachings of this disclosure.

FIG. 2 is a block diagram of an example system 200 having a plurality of voice-based interactive devices 210, 211, 212 and 213 that produce respective artificial speech 220, 221, 222, 223 using unique respective voices in accordance with the teachings of this disclosure. In the example system 200 of FIG. 2, the example voice-based interactive devices 210-213 speak with audibly different (e.g., discernable, distinct, unique, different, etc.) voices that allow a person 230 to readily discern which of the voice-based interactive devices 210-213 is speaking. The voice-based interactive devices 210-213 generate artificial speech 220-223 that is audibly different based on respective unique device-specific identifiers 240-243 that uniquely identify each voice-based interactive device 210-213. Because the voice-based interactive devices 210-213 sound different to the person 230, the person 230 can more easily identify which voice-based interactive device 210-213 is speaking, possibly even while they are speaking at the same time and, thus, more easily determine how to command and/or respond to the voice-based interactive device 210-213.

Figure 3:
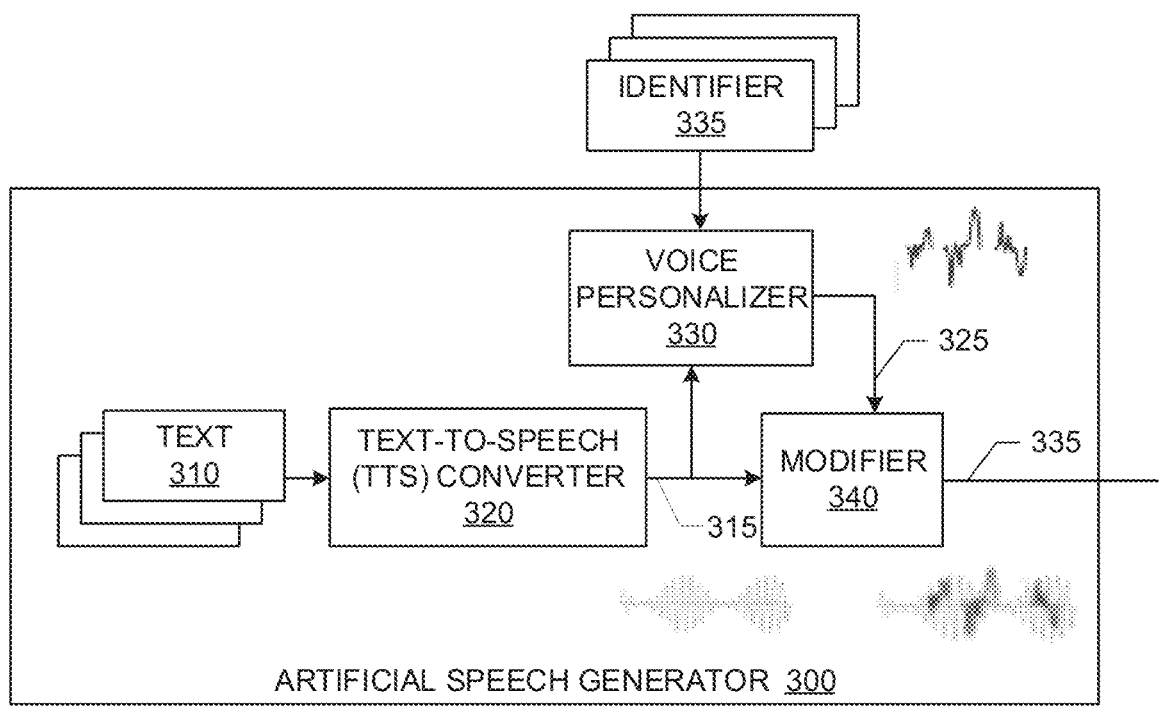
FIG. 3 is a block diagram of an example artificial speech generator that may be used to implement the example voice-based interactive devices of FIG. 2 according to the teachings of this disclosure.

To generate artificial speech, the example voice-based interactive device 210 of FIG. 2 includes an example artificial speech generator 250. The example artificial speech generator 250 of FIG. 2 performs text-to-speech conversion to convert text 255 to form an example personalized artificial speech signal 260 that can be output via an output device 265. As discussed in more detail below in connection with FIGS. 2 and 4, the text-to-speech conversion performed by the example artificial speech generator 250 is based on the identifier 240. The personalized artificial speech signal 260 generated by the artificial speech generator 250 differs from that generated by another voice-based interactive device 221-223 because the identifier 240 differs from the identifiers 241-243 of the other voice-based interactive devices 211-213. In some examples, the artificial speech generator 250 generates artificial speech based on an initial or base voice selected from a set of one or more configurable or selectable voices (e.g., Siri, Cortana, etc.) that is uniquely modified or changed based on the identifier 240 to form a unique, personalized voice that is different from that of other voice-based interactive devices 210-213, even if the other voice-based interactive devices 210-213 were configured to use the same initial or base voice. FIG. 3 illustrates an example artificial speech generator 300 that can be used to implement the example artificial speech generator 250 of FIG. 2.

Example output devices 265 include, but are not limited to, a speaker, an audio jack, a digital-to-analog converter, a digital audio output signal, etc. In some examples, the text 255 is provided by a processor 270, such as that shown in FIG. 9 and discussed below. In some examples, the text 255 is stored in a computer-readable storage medium, such as one or more of those shown in FIG. 9 and discussed below.

To provide other functionality for the voice-based interactive device 210, the example voice-based interactive device 210 of FIG. 2 includes one or more other input and/or output devices, one of which is designated at reference numeral 275. Example other input and/or output devices 275 include, but are not limited to, microphones, sensors, actuators, lights, computer-readable storage mediums, etc. In the example of FIG. 2, the example processor 270 controls the input and/or output devices 275, and receives inputs from the input and/or the output devices 275 to implement one or more functions of the voice-based interactive device 210.

Figure 9:
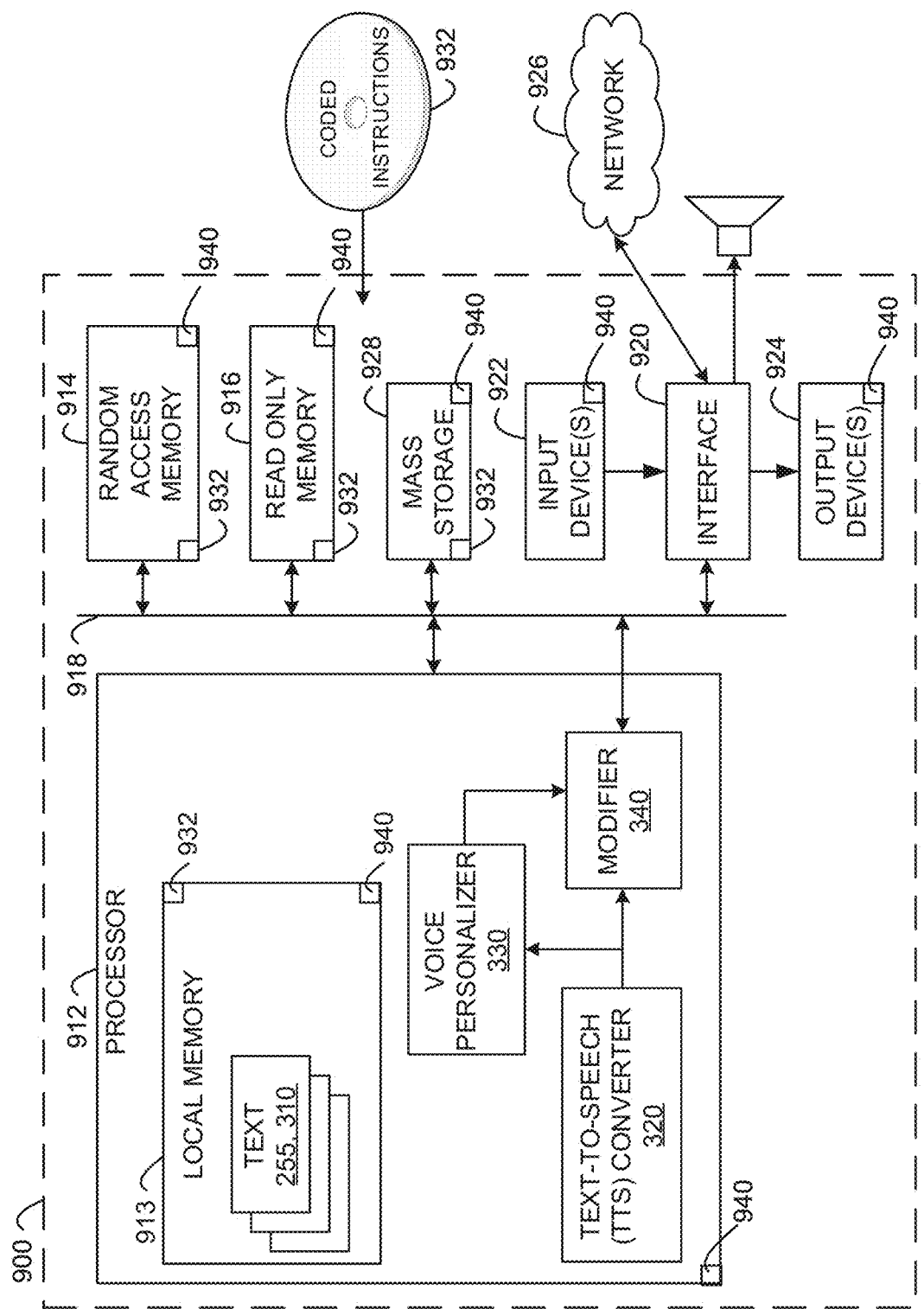
FIG. 9 illustrates an example processor system structured to execute the example instructions of FIGS. 7 and 8 to implement the example artificial speech generators of FIGS. 2 and/or 3.

In some examples, a processor platform, such as the example processor platform 900 discussed below in connection with FIG. 9, is used to implement the example voice-based interactive device 210 of FIG. 2.

FIG. 3 is a block diagram of an example artificial speech generator 300 that can be used to implement the example artificial speech generator 250 of FIG. 2. To convert words, phrases, segment, sentences, etc. of text 310 to an artificial speech signal 315, the example artificial speech generator 300 of FIG. 3 includes an example text-to-speech (TTS) converter 320. Using any number and/or type(s) of circuit(s), method(s) and/or algorithm(s), the TTS converter 320 converts the text 310 to the artificial speech signal 315 using a base or initial voice. In some examples, the conversion performed by the TTS converter 320 is based on an initial or base voice selected from a set of one or more configurable or selectable voices (e.g., Siri, Cortana, etc.).

To form an example voice personalization signal 325, the example artificial speech generator 300 includes an example voice personalizer 330. The example voice personalizer 330 of FIG. 3 modifies an artificial speech signal 315, based on a unique device-specific identifier 335, to form the example voice personalization signal 325. As will be described in more detail below in connection with FIGS. 5 and 6, and in some examples, the voice personalizer 330 uses the unique device-specific identifier 335 to generate the voice personalization signal 325 to represent one or more harmonics, one or more disharmonious overtones, etc. from the artificial speech signal 315. Because the voice personalization signal 325 is generated based on the unique device-specific identifier 335 from the artificial speech signal 315, the voice personalization signal 325 is different from what would generated by any other voice-based interactive device.

In the example of FIG. 3, the example voice personalizer 330 obtains the unique device-specific identifier 335 using an identifier (ID) interface 337. In some examples, the example ID interface 337 includes an application programming interface (API) or hardware abstraction layer (HAL) implemented by an operating system (OS) of a voice-based interactive device. Because the example API or HAL enables the voice personalizer 330 to indirectly obtain the identifier 335 from a device, component, interface, etc., the voice personalizer 330 does not need to be able to interact directly with the device, component, interface, etc. of the voice-based interactive device. In some examples, the example ID interface 337 includes an API provided by a device, component, interface, etc. that enables the voice personalizer 330 to directly interact with device, component, interface, etc. to obtain the identifier 335. In some examples, the example ID interface 337 includes a computer-readable storage medium (e.g., a non-volatile memory) that can be accessed by the voice personalizer 330 to obtain the identifier 335. In some examples, devices, components, etc. of a voice-based interactive device, are hardware devices, components, interfaces, etc. that have a unique device-specific identifier 335 stored on them during manufacture in a non-volatile computer-readable storage medium.

To form a personalized artificial speech signal 335, the example artificial speech generator 300 of FIG. 3 includes an example modifier 340. The example modifier 340 of FIG. 3 modifies the artificial speech signal 315 with the voice personalization signal 325 to form the example personalized artificial speech signal 335. In some examples, the modifier 340 mixes the artificial speech signal 335 with the voice personalization signal 325. In some examples, the modifier 340 performs the mixing using digital combining. In some examples, the modifier 340 performs the mixing using an analog mixer, such as the example analog mixer 400 of FIG. 4.

Figure 4:
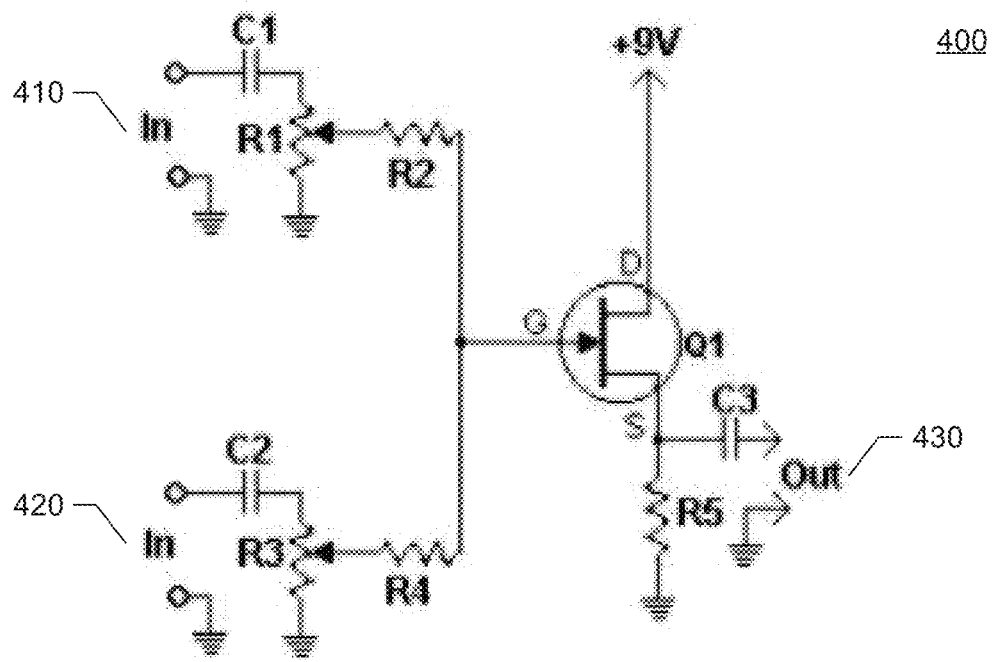
FIG. 4 is a schematic of an example mixer that may be used to implement the example artificial speech generator of FIG. 3.

The example analog mixer 400 of FIG. 4 has a first input 410 receiving the voice personalization signal 325, a second input 420 receiving the artificial speech signal 315, and an output 430 providing the personalized artificial speech signal 335.

Returning to FIG. 3, another example modifier 340 uses the voice personalization signal 325 as a control input signal for a voltage-controlled crystal oscillator, and the output of the crystal oscillator to modulate the artificial speech signal 315 to form the personalized artificial speech signal 335.

Figure 5:
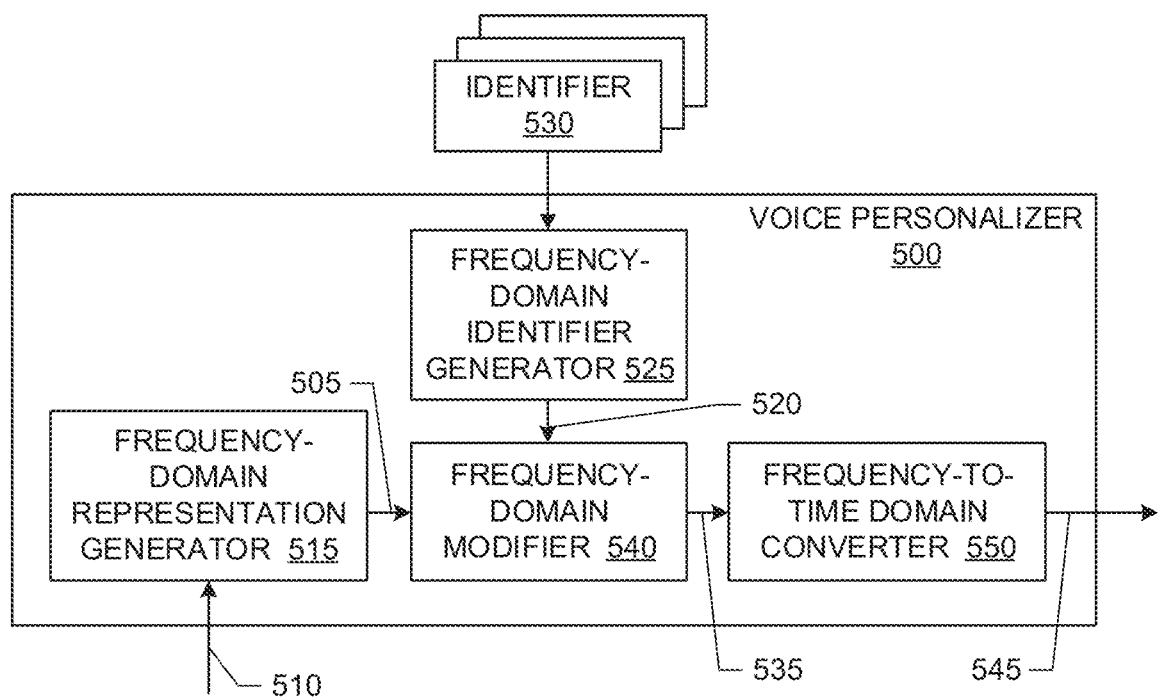
FIG. 5 is a block diagram of an example voice personalizer that may be used to implement the example artificial speech generator of FIG. 3 according to the teachings of this disclosure.
Figure 6:
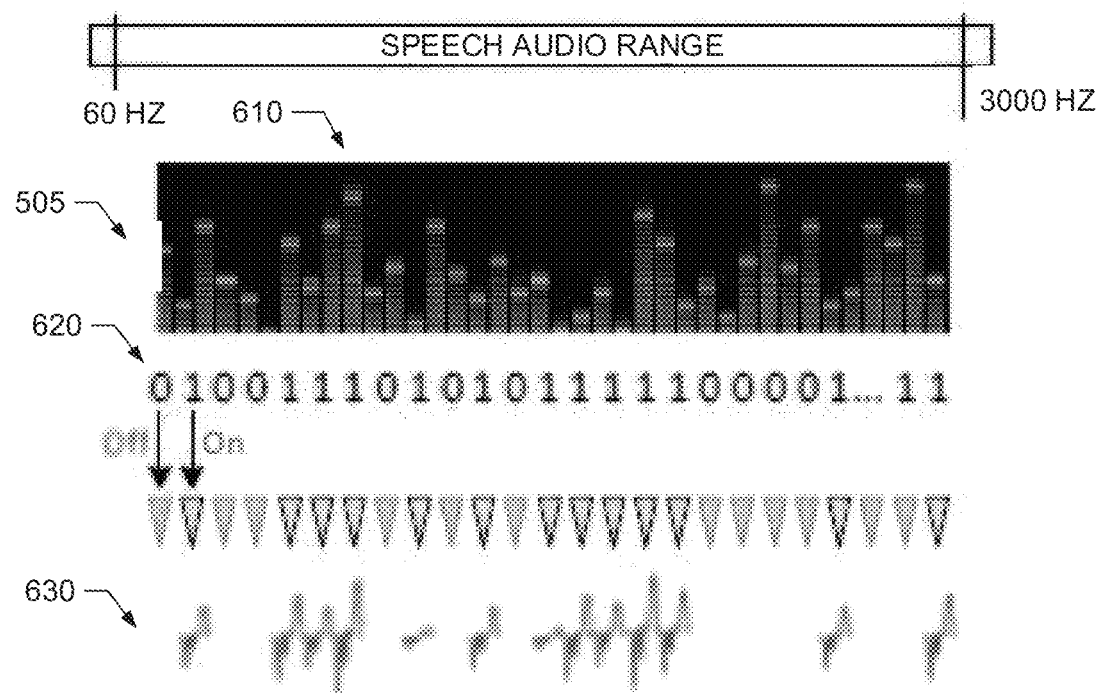
FIG. 6 is a graph illustrating an example operation of the example voice personalizer of FIGS. 3 and 5.

FIG. 5 is a block diagram of an example voice personalizer 500 that may be used to implement the example voice personalizer 330 of FIG. 3. To generate a frequency representation 505 of an artificial speech signal 510, such as the example artificial speech signal 315 of FIG. 3, the example voice personalizer 500 of FIG. 5 includes an example frequency-domain representation generator 515. In some examples, the frequency-domain representation generator 515 generates the frequency representation 505 by measuring the power or amplitude of the artificial speech signal 510 at a plurality of frequencies and/or in a plurality of frequency bands or bins (one of which is designated at reference numeral 610 in FIG. 6). In some examples, the frequencies, bands and/or bins 610 extend over a range of frequencies (e.g., 60 Hz to 3 kHz) representative of audible speech.

To generate a frequency-domain identifier 520, the example voice personalizer 500 of FIG. 5 includes an example frequency-domain identifier generator 525. In some examples, the example frequency-domain identifier generator 525 of FIG. 5 generates the frequency-domain identifier 520 by assigning bits 620 of a unique device-specific identifier 530 to respective ones of the frequencies, bands and/or bins 610.

To form a frequency-domain personalization signal 535, the example voice personalizer 500 of FIG. 5 includes an example frequency-domain modifier 540. The example frequency-domain modifier 540 of FIG. 5 turns on and off individual ones of the frequencies, bins, bands 610 based on their respective ones of the bits 620 of the frequency-domain identifier 520 to form a set harmonics or disharmonious overtones 630 representing the frequency-domain personalization signal 535.

To form a voice personalization signal 545, the example voice personalizer 500 of FIG. 5 includes an example frequency-to-time domain converter 550. In some examples, the example frequency-to-time domain converter 550 of FIG. 5 converts the set of harmonics and/or disharmonious overtones 630 into a set of sinusoidal signals, which are combined in the time domain to form the voice personalization signal 545.

In some examples, the example frequency-domain representation generator 515, the example frequency-domain identifier generator 525, and the example frequency-to-time domain converter 550 are implemented using Fourier transforms, spectral analysis, etc.

While example implementations of the example voice-based interactive devices 110, 210-213, the example identifiers 240-243, 335, 525, the example artificial speech generator 250, 300, the example TTS converter 320, the example voice personalizer 330, 500 the example modifier 340, the example mixer 400, the example frequency-domain representation generator 515, the example frequency-domain identifier generator 525, the example frequency-domain modifier 540, and the example frequency-to-time domain converter 550 are shown in FIGS. 1-5, one or more of the elements, processes and/or devices illustrated in FIGS. 1-5 may be combined, divided, re-arranged, omitted, eliminated and/or implemented in any other way. Further, the example voice-based interactive devices 110, 210-213, the example identifiers 240-243, 335, 525, the example artificial speech generator 250, 300, the example TTS converter 320, the example voice personalizer 330, 500 the example modifier 340, the example mixer 400, the example frequency-domain representation generator 515, the example frequency-domain identifier generator 525, the example frequency-domain modifier 540, and the example frequency-to-time domain converter 550 are shown in FIGS. 1-5 could be implemented by one or more analog or digital circuit(s), logic circuits, programmable processor(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example voice-based interactive devices 110, 210-213, the example identifiers 240-243, 335, 525, the example artificial speech generator 250, 300, the example TTS converter 320, the example voice personalizer 330, 500 the example modifier 340, the example mixer 400, the example frequency-domain representation generator 515, the example frequency-domain identifier generator 525, the example frequency-domain modifier 540, and the example frequency-to-time domain converter 550 are shown in FIGS. 1-5 is/are hereby expressly defined to include a tangible computer-readable storage medium storing the software and/or firmware. Further still, the example voice-based interactive devices 110, 210-213, the example identifiers 240-243, 335, 525, the example artificial speech generator 250, 300, the example TTS converter 320, the example voice personalizer 330, 500 the example modifier 340, the example mixer 400, the example frequency-domain representation generator 515, the example frequency-domain identifier generator 525, the example frequency-domain modifier 540, and the example frequency-to-time domain converter 550 are shown in FIGS. 1-5 of FIGS. 1-5 may include one or more elements, processes and/or devices in addition to, or instead of, those illustrated in FIGS. 1-5, and/or may include more than one of any or all of the illustrated elements, processes and devices.

Figures 7, 8:
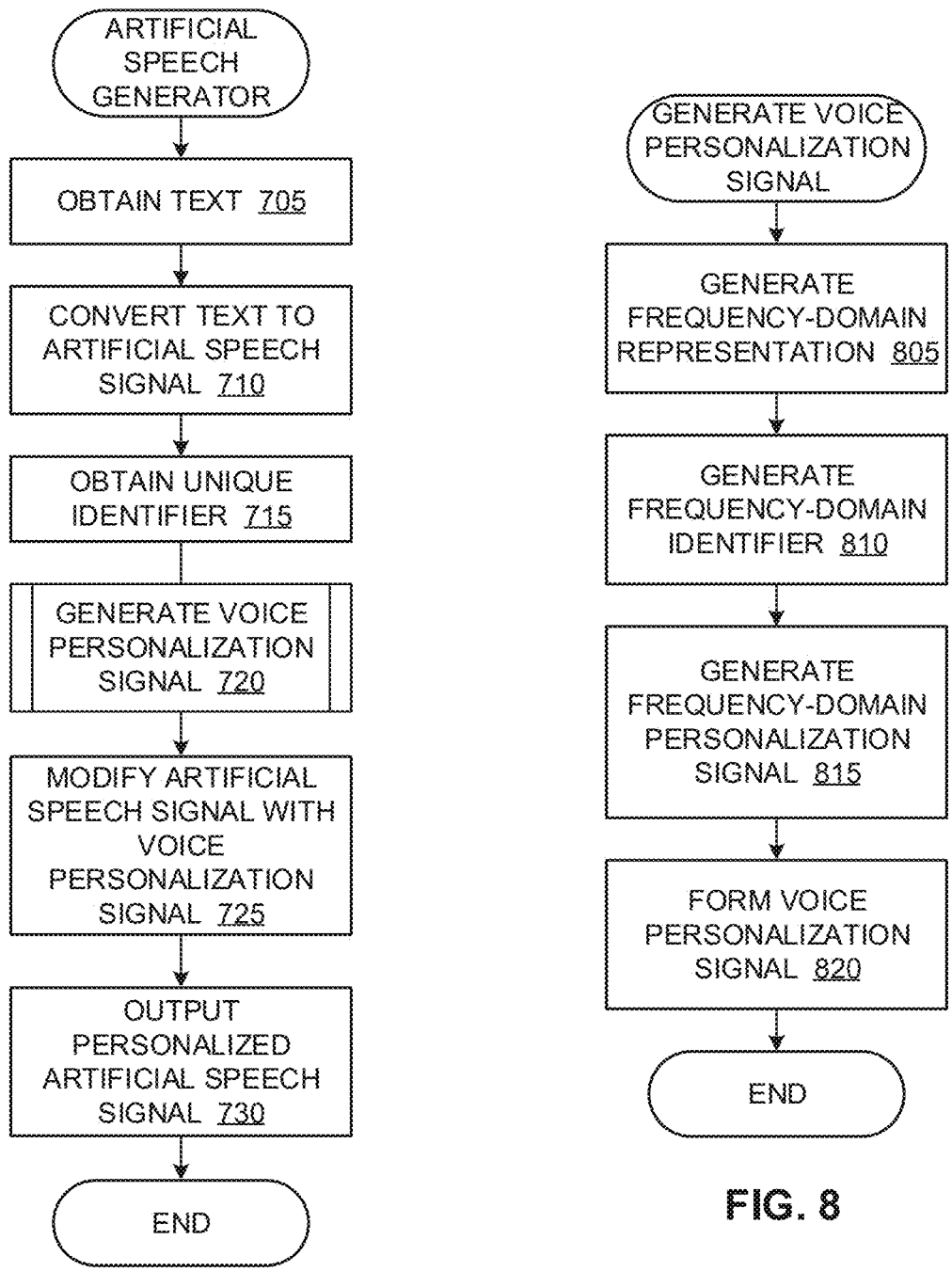
FIG. 7 is a flow diagram representing example processes that may be implemented as machine-readable instructions that may be executed to implement the example artificial speech generator of FIGS. 2 and 3.
FIG. 8 is a flow diagram representing example processes that may be implemented as machine-readable instructions that may be executed to implement the example voice personalizer of FIGS. 3 and 5.

FIG. 7 is a flow diagram representative of example process(es) that may be implemented as coded computer-readable instructions, the coded instructions may be executed to implement the example artificial speech generators 250 and 300 to generate voices for artificial speech. FIG. 8 is a flow diagram representative of example process(es) that may be implemented as coded computer-readable instructions, the coded instructions may be executed to implement the example voice personalizers 330 and 500 to generate personalization voice signals. In these example, the coded instructions comprise one or more programs for execution by a processor such as the processor 912 shown in the example processor platform 900 discussed below in connection with FIG. 9. The program(s) may be embodied in the coded instructions and stored on one or more tangible computer-readable storage mediums associated with the processor 912. One or more of the program(s) and/or parts thereof could alternatively be executed by a device other than the processor 912. One or more of the programs may be embodied in firmware or dedicated hardware. Further, although the example process(s) is/are described with reference to the flowcharts illustrated in FIGS. 7 and 8, many other methods of implementing the example artificial speech generators and the example voice personalizers may alternatively be used. For example, the order of execution of the blocks may be changed, and/or some of the blocks described may be changed, eliminated, or combined.

As mentioned above, the example process(es) of FIGS. 7 and 8 may be implemented using coded instructions (e.g., computer-readable instructions and/or machine-readable instructions) stored on one or more tangible computer-readable storage mediums. As used herein, the term tangible computer-readable storage medium is expressly defined to include any type of computer-readable storage device and/or storage disk and to exclude propagating signals and to exclude transmission media. As used herein, "tangible computer-readable storage medium" and "tangible machine-readable storage medium" are used interchangeably. Additionally, or alternatively, the example process(es) of FIGS. 7 and 8 may be implemented using coded instructions (e.g., computer-readable instructions and/or machine-readable instructions) stored on one or more non-transitory computer mediums. As used herein, the term non-transitory computer-readable storage medium is expressly defined to include any type of computer-readable storage device and/or storage disk and to exclude propagating signals and to exclude transmission media. As used herein, "non-transitory computer-readable storage medium" and "non-transitory machine-readable storage medium" are used interchangeably.

Example tangible computer-readable storage mediums include, but are not limited to, any tangible computer-readable storage device or tangible computer-readable storage disk such as a memory associated with a processor, a memory device, a flash drive, a digital versatile disk (DVD), a compact disc (CD), a Blu-ray disk, a floppy disk, a hard disk drive, a random access memory (RAM), a read-only memory (ROM), etc. and/or any other storage device or storage disk in which information is stored for any duration (e.g., for extended time periods, permanently, for brief instances, for temporarily buffering, and/or for caching of the information).

The example process of FIG. 7 includes obtaining text for conversion to a speech signal (block 705), and the TTS converter 320 converts the text to an artificial speech signal (block 710). A unique device-specific identifier is obtained (block 715) using, for instance, the example ID interface 337, and the voice personalizer 330, 500 generates a voice personalization signal using the unique device-specific identifier from the artificial speech signal (block 720). In some example, the voice personalization signal is generated using the example process of FIG. 8.

The modifier 340, 400 modifies the artificial speech signal using the voice personalization signal to form a personalized artificial speech signal (block 725), and the personalized artificial speech signal is output via an output device 265 (block 730). Control then exits from the example process of FIG. 7.

The example process of FIG. 8 includes the frequency-domain representation generator 515 generating a frequency-domain representation of an artificial speech signal (block 805), and the frequency-domain identifier generator 525 generating a frequency-domain identifier (block 810). The frequency-domain multiplier 540 modifies the frequency-domain representation using the frequency-domain identifier (block 815). The frequency-to-domain converter 550 generates a voice personalization signal from the modified frequency-domain identifier (block 820). Control then exits from the example process of FIG. 8.

FIG. 9 is a block diagram of an example processor platform 900 configured to, among other things, execute the process(es) of FIGS. 7 and 8 to implement the example voice-based interactive devices, the example artificial speech generators, and the example voice personalizers disclosed herein. The processor platform 900 can be, for example, a server, a personal computer, or any other type of computing device.

The processor platform 900 of the illustrated example includes a processor 912. The processor 912 of the illustrated example is hardware. For example, the processor 912 can be implemented by one or more integrated circuits, logic circuits, processor circuitry, microprocessors, GPUs, or controllers from any desired family or manufacturer.

In the illustrated example, the processor 912 stores text for conversion to speech, and/or implements the example voice-based interactive devices, the example artificial speech generators, and the example voice personalizers described above in connection with FIGS. 1-5.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), Rambus Dynamic Random Access Memory (RDRAM) and/or any other type of random access memory (RAM) device. The non-volatile memory 916 may be implemented by flash memory and/or any other desired type of memory device. Access to the main memory 914, 916 is controlled by a memory controller.

In the illustrated example, any one or more of the local memory 913, the RAM 914, the read only memory 916, and/or a mass storage device 928 may store the example text 255, 310, and/or the example unique device-specific identifiers 240-243, 310.

The processor platform 900 of the illustrated example also includes an interface circuit 920. The interface circuit 920 may be implemented by any type of interface standard, such as an Ethernet interface, a universal serial bus (USB), and/or a peripheral component interconnect (PCI) express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent (RAID) systems, and DVD drives.

Coded instructions 932 include the machine-readable instructions of FIGS. 7 and 8, and may be stored in the mass storage device 928, in the volatile memory 914, in the non-volatile memory 916, and/or on a removable computer-readable storage medium such as a CD or DVD.

One or more of the components of FIG. 9 store a unique device-specific identifier 940 that may be used generate personalized artificial speech signals in accordance with the teachings of this disclosure. In some examples, the example voice personalizer 330 obtains a unique device-specific identifier 940 using the example ID interface 337 implemented by an OS executing on the processor 912.

From the foregoing, it will be appreciated that methods, apparatus and articles of manufacture have been disclosed that enhance the operations of computers, devices and systems to improve the generation of voices for artificial speech. That is, through the use of these processes, computers, devices and systems can operate more generating unique artificial speech that can be used to distinguish computers, devices and systems. Furthermore, example methods, apparatus, and/or articles of manufacture disclosed herein identify and overcome inability in the prior art to distinguish computers, devices and systems based on audible artificial speech.

Example methods, apparatus, and articles of manufacture to generate voices for artificial speech are disclosed herein. Further examples and combinations thereof include the following.

Example 1 is an apparatus that includes a component storing an identifier, the identifier uniquely identifying the apparatus from a plurality of apparatus, an artificial speech generator to generate a first artificial speech signal representing text, the first artificial speech signal generated based on the identifier, the first artificial speech signal audibly different from artificial speech signals generated by respective ones of the plurality of apparatus for the text, and an output device to output an audible signal representing the first artificial speech signal.

Example 2 includes the apparatus as defined in example 1, wherein the artificial speech generator is to generate the first artificial speech signal based on the identifier by generating a voice personalization signal based on the identifier, and generating the first artificial speech signal using the voice personalization signal.

Example 3 includes the apparatus as defined in example 2, wherein the artificial speech generator includes a text-to-speech converter to convert the text to generate a second artificial speech signal, and a modifier to modify the second artificial speech signal with the voice personalization signal to form the first artificial speech signal.

Example 4 includes the apparatus as defined in example 2, wherein the voice personalization signal includes at least one of a harmonic, or a disharmonious overtone.

Example 5 includes the apparatus as defined in example 1, further comprising a processor to execute an operating system, and an application programming interface on the operating system, the artificial speech generator to obtain the identifier using the application programming interface.

Example 6 includes the apparatus as defined in example 1, wherein the artificial speech generator includes a text-to-speech converter to convert the text to generate a second artificial speech signal, a voice personalizer to modify the second artificial speech signal using the identifier to form a voice personalization signal, and a modifier to modify the second artificial speech signal with the voice personalization signal to form the first artificial speech signal.

Example 7 includes the apparatus as defined in example 6, wherein the voice personalizer includes a frequency-domain representation generator to generate a frequency-domain representation of the second artificial speech signal, a frequency-domain identifier generator to generate a frequency-domain identifier from the identifier, a frequency-domain modifier to modify the frequency-domain representation with the frequency-domain identifier to form a frequency-domain voice personalization signal, and a frequency-to-time domain converter to form the voice personalization signal from the frequency-domain voice personalization signal.

Example 8 includes the apparatus as defined in example 6, wherein the modifier includes an audio mixer to combine the second artificial speech signal and the voice personalization signal to form the first artificial speech signal.

Example 9 includes the apparatus as defined in example 8, wherein the audio mixer is at least one of a digital mixer, a digital audio output signal or an analog mixer.

Example 10 includes the apparatus as defined in any of examples 2 to 8, wherein the voice personalization signal includes at least one of a harmonic, or a disharmonious overtone.

Example 11 includes the apparatus as defined in any of examples 1 to 10, wherein the output device is at least one of a speaker, an audio jack, or a digital-to-analog converter.

Example 12 includes the apparatus as defined in example 1, wherein the apparatus includes a non-transitory computer-readable storage medium storing instructions, and processor circuitry to execute the instructions to generate the first artificial speech signal.

Example 13 includes the apparatus as defined in any of examples 1 to 12, wherein the identifier includes at least one of a serial number, an international mobile equipment identity (IMEI) number, a media access control (MAC) address, a device unique identifier (DUID), a processor serial number, a central processing unit (CPU) serial number, a management information base (MIB) identifier, or a Bluetooth® address.

Example 14 includes the apparatus as defined in any of examples 1 to 13, further comprising a processor to execute an operating system, and an application programming interface on the operating system, the artificial speech generator to obtain the identifier using the application programming interface.

Example 15 includes a method including obtaining an identifier for a device of an apparatus, the identifier uniquely identifying the apparatus from a plurality of apparatus, and converting text to an artificial speech signal, the artificial speech signal based on the identifier, the artificial speech signal audibly different from artificial speech signals output by respective ones of the plurality of apparatus for the text.

Example 16 includes the method as defined in example 13, further including generating a voice personalization signal using the identifier, wherein converting the text to the artificial speech signal uses the voice personalization signal to modify a second artificial speech signal.

Example 17 includes the method as defined in example 14, wherein generating the voice personalization signal using the identifier includes modifying the second artificial speech signal using the identifier.

Example 18 includes the method as defined in example 15, wherein modifying the second artificial speech signal using the personalization voice signal to form the artificial speech signal includes mixing the second artificial speech signal and the voice personalization signal.

Example 19 includes the method as defined in example 14, 15, or 18, wherein generating the voice personalization signal includes generating a frequency-domain representation of the second artificial speech signal, generating a frequency-domain identifier from the identifier, modifying the frequency-domain representation with the frequency-domain identifier to form a frequency-domain personalization signal, and forming the voice personalization signal from the frequency-domain personalization signal.

Example 20 includes the method as defined in any of claims 13 to 19, wherein the identifier includes at least one of a serial number, an international mobile equipment identity (IMEI) number, a media access control (MAC) address, a device unique identifier (DUID), a processor serial number, a central processing unit (CPU) serial number, a management information base (MIB) identifier, or a Bluetooth® address.

Example 21 includes a non-transitory computer-readable storage medium comprising instructions that, when executed, cause a machine to perform at least obtain an identifier of a component of an apparatus, the identifier uniquely identifying the apparatus from a plurality of apparatus, and convert text to an artificial speech signal, the artificial speech signal based on the identifier, the artificial speech signal audibly different from artificial speech signals output by respective ones of the plurality of apparatus for the text.

Example 22 includes the non-transitory computer-readable storage medium as defined in example 16, wherein the instructions further cause the machine to convert the text to the artificial speech signal by converting the text to a second artificial speech signal, generating a voice personalization signal by modifying the second artificial speech signal using the identifier, and modifying the second artificial speech signal using the voice personalization signal to form the artificial speech signal.

Example 23 includes the non-transitory computer-readable storage medium as defined in example 22, wherein the instructions further cause the machine to modify the second artificial speech signal using the personalization voice signal to form the artificial speech signal includes mixing the second artificial speech signal and the voice personalization signal.

Example 24 includes the non-transitory computer-readable storage medium as defined in example 22 or 23, wherein the instructions further cause the machine to generate the voice personalization signal by generating a frequency-domain representation of the second artificial speech signal, generating a frequency-domain identifier from the identifier, modifying the frequency-domain representation with the frequency-domain identifier to form a frequency-domain personalization signal, and forming the voice personalization signal from the frequency-domain personalization signal.

Example 25 includes the non-transitory computer-readable storage medium as defined in any of examples 16 to 24, wherein the identifier includes at least one of a serial number, an international mobile equipment identity (IMEI) number, a media access control (MAC) address, a device unique identifier (DUID), a processor serial number, a central processing unit (CPU) serial number, a management information base (MIB) identifier, or a Bluetooth® address.

Example 26 includes a non-transitory computer-readable storage medium comprising instructions that, when executed, cause a machine to perform the method of any of claims 15 to 20.

Example 27 is a system including means for storing an identifier, the identifier uniquely identifying the apparatus from a plurality of apparatus, and means for generating a first artificial speech signal representing text, the first artificial speech signal generated based on the identifier, the first artificial speech signal audibly different from artificial speech signals generated by respective ones of the plurality of apparatus for the text.

Example 28 is the system as defined in example 27, further including means for generating a voice personalization signal based on the identifier, and means for generating the first artificial speech signal using the voice personalization signal.

Example 29 is the system as defined in example 28, further including means for converting the text to generate a second artificial speech signal, and means for modifying the second artificial speech signal with the voice personalization signal to form the first artificial speech signal.

Example 30 is the system as defined in example 28, wherein the voice personalization signal includes at least one of a harmonic, or a disharmonious overtone.

Example 31 is the system as defined in example 27, further including means for converting the text to generate a second artificial speech signal, means for modifying the second artificial speech signal using the identifier to form a voice personalization signal, means for modifying the second artificial speech signal with the voice personalization signal to form the first artificial speech signal, and means for outputting an audio signal representing the first artificial speech signal.

Example 32 is the system as defined in example 31, further including means for generating a frequency-domain representation of the second artificial speech signal, means for generating a frequency-domain identifier from the identifier, means for modifying the frequency-domain representation with the frequency-domain identifier to form a frequency-domain voice personalization signal, and means for forming the voice personalization signal from the frequency-domain voice personalization signal.

Example 33 is the system as defined in example 27, wherein the identifier includes at least one of a serial number, an international mobile equipment identity (IMEI) number, a media access control (MAC) address, a device unique identifier (DUID), a processor serial number, a central processing unit (CPU) serial number, a management information base (MIB) identifier, or a Bluetooth® address.

Example 34 is the system as defined in example 27, further including means for executing an operating system, and an application programming interface on the operating system, wherein the identifier is obtainable using the application programming interface.

An example method includes obtaining an identifier from a device of an apparatus, the identifier uniquely identifying the apparatus from a plurality of apparatus, and converting text to an artificial speech signal, the artificial speech signal based on the identifier, the artificial speech signal audibly different from artificial speech signals output by respective ones of the plurality of apparatus for the text.

An example non-transitory computer-readable storage medium stores instructions that, when executed, cause a machine to perform at least obtain an identifier from a component of an apparatus, the identifier uniquely identifying the apparatus from a plurality of apparatus, and convert text to an artificial speech signal, the artificial speech signal based on the identifier, the artificial speech signal audibly different from artificial speech signals output by respective ones of the plurality of apparatus for the text.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, as used herein, when the phrase "at least" is used in this specification and/or as the transition term in a preamble of a claim, it is open-ended in the same manner as the term "comprising" is open ended.

Further, connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. An apparatus comprising:
   an artificial speech generator to:
      assign individual bits of a string of bits to different frequency bands in a frequency-domain representation of a first artificial speech signal, the string of bits corresponding to an identifier for the apparatus;
      generate a voice personalization signal based on a subset of the frequency bands, the subset of the frequency bands identified based on values of the individual bits; and
      mix the first artificial speech signal with the voice personalization signal to generate a modified artificial speech signal; and
   an output device to output an audible signal based on the modified artificial speech signal.

2. The apparatus of claim 1, wherein the identifier is different than a plurality of other identifiers corresponding to respective ones of a plurality of other apparatus.

3. The apparatus of claim 2, wherein the first artificial speech signal corresponds to text, the audible signal to be audibly different to a human listener from other audible signals generated by respective ones of the plurality of other apparatus for the same text.

4. The apparatus of claim 2, wherein the first artificial speech signal is based on text and the artificial speech generator includes a text-to-speech converter to convert the text to generate the first artificial speech signal.

5. The apparatus of claim 1, wherein the subset of the frequency bands includes a first set of the frequency bands and excludes a second set of the frequency bands, the individual bits having a first value assigned to the first set of the frequency bands, the individual bits having a second value assigned to the second set of the frequency bands.

6. The apparatus of claim 1, wherein the first artificial speech signal includes at least one of first harmonics or first overtones, the voice personalization signal including at least one of second harmonics or disharmonious overtones that complement the at least one of the first harmonics or the first overtones, the at least one of the second harmonics or the disharmonious overtones based on the subset of the frequency bands.

7. The apparatus of claim 1, wherein the artificial speech generator includes:
   a frequency-domain representation generator to generate the frequency-domain representation of the first artificial speech signal;
   a frequency-domain identifier generator to generate a frequency-domain identifier based on the individual bits of the string of bits associated with the identifier;
   a frequency-domain modifier to modify the frequency-domain representation of the first artificial speech signal with the frequency-domain identifier to form a frequency-domain voice personalization signal; and a frequency-to-time domain converter to generate the voice personalization signal from the frequency-domain voice personalization signal.

8. A non-transitory computer-readable storage medium comprising instructions that, when executed, cause a machine to at least:
assign individual bits of a string of bits to different frequency bands in a frequency-domain representation of a first artificial speech signal, the string of bits corresponding to an identifier for the machine;
generate a voice personalization signal based on a subset of the frequency bands, the subset of the frequency bands identified based on values of the individual bits;
mix the first artificial speech signal with the voice personalization signal to generate a modified artificial speech signal; and
output an audible signal based on the modified artificial speech signal.

9. The non-transitory computer-readable storage medium of claim 8, wherein the identifier is different than a plurality of other identifiers corresponding to respective ones of a plurality of other machines.

10. The non-transitory computer-readable storage medium of claim 9, wherein the first artificial speech signal corresponds to text, the audible signal to be audibly different to a human listener from other audible signals generated by respective ones of the plurality of other machines for the same text.

11. The non-transitory computer-readable storage medium of claim 9, wherein the first artificial speech signal is based on text and the instructions further cause the machine to convert the text to the first artificial speech signal.

12. The non-transitory computer-readable storage medium of claim 8, wherein the subset of the frequency bands includes a first set of the frequency bands and excludes a second set of the frequency bands, the individual bits having a first value assigned to the first set of the frequency bands, the individual bits having a second value assigned to the second set of the frequency bands.

13. The non-transitory computer-readable storage medium of claim 8, wherein the first artificial speech signal includes at least one of first harmonics or first overtones, the voice personalization signal including at least one of second harmonics or disharmonious overtones that complement the at least one of the first harmonics or the first overtones, the at least one of the second harmonics or the disharmonious overtones based on the subset of the frequency bands.

14. The non-transitory computer-readable storage medium of claim 8, wherein the instructions further cause the machine to:
generate the frequency-domain representation of the first artificial speech signal;
generate a frequency-domain identifier based on the individual bits of the string of bits associated with the identifier;
modify the frequency-domain representation of the first artificial speech signal with the frequency-domain identifier to form a frequency-domain voice personalization signal; and
generate the voice personalization signal from the frequency-domain voice personalization signal.

15. An apparatus comprising:
means for generating a voice personalization signal based on a subset of frequency bands in a frequency-domain representation of a first artificial speech signal, the means for generating the voice personalization signal including means for generating a frequency-domain identifier by assigning individual bits of a string of bits to different ones of the frequency bands, the string of bits corresponding to an identifier for the apparatus, the subset of the frequency bands identified based on values of the individual bits;
means for mixing the first artificial speech signal with the voice personalization signal to generate a modified artificial speech signal; and
means for outputting an audible signal based on the modified artificial speech signal.

16. The apparatus of claim 15, wherein the identifier is different than a plurality of other identifiers corresponding to respective ones of a plurality of other apparatus.

17. The apparatus of claim 16, wherein the first artificial speech signal corresponds to text, the audible signal to be audibly different to a human listener from other audible signals generated by respective ones of the plurality of other apparatus for the same text.

18. The apparatus of claim 16, wherein the first artificial speech signal is based on text, the apparatus further including means for converting the text to the first artificial speech signal.

19. The apparatus of claim 15, wherein the subset of the frequency bands includes a first set of the frequency bands and excludes a second set of the frequency bands, the individual bits having a first value assigned to the first set of the frequency bands, the individual bits having a second value assigned to the second set of the frequency bands.

20. The apparatus of claim 15, wherein the first artificial speech signal includes at least one of first harmonics or first overtones, the voice personalization signal including at least one of second harmonics or disharmonious overtones that complement the at least one of the first harmonics or the first overtones, the at least one of the second harmonics or the disharmonious overtones based on the subset of the frequency bands.

21. The apparatus of claim 15, wherein the means for generating the voice personalization signal includes:
means for generating the frequency-domain representation of the first artificial speech signal;
means for modifying the frequency-domain representation of the first artificial speech signal with the frequency-domain identifier to form a frequency-domain voice personalization signal; and
means for generating the voice personalization signal from the frequency-domain voice personalization signal.

* * * * *